(12) United States Patent
Sheng et al.

(10) Patent No.: US 11,039,026 B2
(45) Date of Patent: Jun. 15, 2021

(54) MULTIPURPOSE IMAGE CAPTURING APPARATUS

(71) Applicant: AVISION INC., Hsinchu (TW)

(72) Inventors: Shao-Lan Sheng, Hsinchu (TW); Chao-Yu Peng, Hsinchu (TW); Shu-Fei Yeh, Hsinchu (TW)

(73) Assignee: AVISION INC., Hsinchu (TW)

( * ) Notice: Subject to any disclaimer, the term of this patent is extended or adjusted under 35 U.S.C. 154(b) by 0 days.

(21) Appl. No.: 16/810,804

(22) Filed: Mar. 5, 2020

(65) Prior Publication Data

US 2020/0329163 A1 Oct. 15, 2020

(30) Foreign Application Priority Data

Apr. 11, 2019 (TW) .................................. 108112611

(51) Int. Cl.
 *H04N 1/00* (2006.01)

(52) U.S. Cl.
 CPC ..... *H04N 1/00538* (2013.01); *H04N 1/00779* (2013.01)

(58) Field of Classification Search
 CPC .... G06F 1/1626; G06F 1/1628; G06F 1/1632; G06F 1/1656; G06F 1/1658; G06F 1/1684; G06F 1/183; G06F 2200/1633; G06K 19/044; G06K 19/0703; G06K 7/10881; H04N 1/00538; H04N 1/00779
 USPC ........................................................ 358/474
 See application file for complete search history.

(56) References Cited

U.S. PATENT DOCUMENTS

| | | | | |
|---|---|---|---|---|
| 6,314,267 | B1* | 11/2001 | Kida | G03G 15/231 399/405 |
| 6,366,747 | B1* | 4/2002 | Roller | G03G 15/5016 399/110 |
| 7,170,557 | B2* | 1/2007 | Manico | G06F 1/1601 348/333.07 |
| 7,697,173 | B2* | 4/2010 | Fang | H04N 1/00551 358/474 |
| 9,632,112 | B2* | 4/2017 | Harding | G01R 21/00 |
| 2003/0210433 | A1* | 11/2003 | Westcott | H04N 1/04 358/474 |
| 2005/0134726 | A1* | 6/2005 | Parulski | H04N 5/2354 348/373 |

(Continued)

FOREIGN PATENT DOCUMENTS

| | | |
|---|---|---|
| CN | 101895654 A | 11/2010 |
| TW | 356634 | 4/1999 |
| TW | 201804781 A | 2/2018 |

*Primary Examiner* — Negussie Worku
(74) *Attorney, Agent, or Firm* — Winston Hsu

(57) ABSTRACT

An image capturing apparatus includes a first image capturing module, a first control module, a second image capturing module and a second control module. When the first control module is electrically connected to an external apparatus or the second control module, the first control module is for transmitting a first image captured by the first image capturing module to the external apparatus or the second control module. When the second control module is electrically connected to the first control module and the external apparatus, the second control module is for transmitting the first image transmitted from the first control module or a second image captured by the second image capturing module to the external apparatus. Therefore, the present application can provide flexibility in use.

10 Claims, 10 Drawing Sheets

(56) References Cited

U.S. PATENT DOCUMENTS

| | | | | |
|---|---|---|---|---|
| 2018/0207948 A1* | 7/2018 | Sheng | .................... | B41J 2/2103 |
| 2019/0075209 A1* | 3/2019 | Sheng | ...................... | H04N 1/04 |
| 2019/0205633 A1* | 7/2019 | Li | ...................... | G06K 9/00228 |
| 2019/0297212 A1* | 9/2019 | Sheng | ................ | H04N 1/00779 |
| 2020/0084323 A1* | 3/2020 | Sheng | ................ | H04N 1/00384 |
| 2020/0084330 A1* | 3/2020 | Sheng | ................ | H04N 1/00535 |

* cited by examiner

MULTIPURPOSE IMAGE CAPTURING APPARATUS

BACKGROUND OF THE DISCLOSURE

1. Field of the Disclosure

The present disclosure relates to an image capturing apparatus, and more particularly, to a multipurpose image capturing apparatus with flexibility in use.

2. Description of the Prior Art

With advancement of scanning technology, scanners are widely used in homes or offices. The scanners can capture images of physical objects, such as documents, photographs and books. The captured digital images can be displayed and stored in computer devices. The digital images of the physical objects can be stored permanently. Therefore, it is not required to store the physical objects anymore, which can save space occupied by the physical objects. Furthermore, it also allows a user to edit or transfer the images easily. Therefore, the scanners have an extensive range of applications. However, although there are various multipurpose scanners available in the market, such conventional multipurpose scanners are large and lack of flexibility in use. There is a need to provide an improved multipurpose image capturing apparatus.

SUMMARY OF THE DISCLOSURE

Therefore, an objective of the present disclosure is to provide a multipurpose image capturing apparatus with flexibility in use for solving the aforementioned problem.

In order to achieve the aforementioned objective, the present disclosure discloses a multipurpose image capturing apparatus includes a first shell, a driving assembly, a first image capturing module, a first control module, a second shell, a second image capturing module and a second control module. A passage is formed inside the first shell. The driving assembly is disposed inside the first shell and for driving a first object to move along the passage. The first image capturing module is disposed inside the first shell and for capturing a first image corresponding to the first object when the driving assembly drives the first object to pass by the first image capturing module along the passage. The first control module includes a first control unit and a first electrical connector. The first control unit is electrically connected to the first electrical connector and the first image capturing module. The second shell is disposed beneath the first shell and supporting the first shell. A chamber is formed inside the second shell and for accommodating a second object. An opening is formed on the second shell and communicated with the chamber for allowing the second object to enter the chamber. The second image capturing module is disposed inside the second shell and for capturing a second image corresponding to the second object accommodated inside the chamber. The second control module includes a second control unit, a second electrical connector and a third electrical connector. The second control unit is electrically connected to the second electrical connector, the third electrical connector and the second image capturing module. The first control unit transmits the first image captured by the first image capturing module to an external apparatus via an electrical connection of the first electrical connector and an electrical connector of the external apparatus when the first electrical connector is electrically connected to the electrical connector of the external apparatus. The first control unit transmits the first image captured by the first image capturing module to the second control unit via an electrical connection of the first electrical connector and the second electrical connector when the first electrical connector is electrically connected to the second electrical connector. The second control unit transmits the first image transmitted from the first control unit via the electrical connection of the first electrical connector and the second electrical connector, or the second image captured by the second image capturing module to the external apparatus when the first electrical connector is electrically connected to the second electrical connector and the third electrical connector is electrically connected to the electrical connector of the external apparatus.

According to an embodiment of the present disclosure, the second image capturing module is configured to capture the second image when the first electrical connector is connected to the second electrical connector. The second image capturing module is configured not to capture the second image when the first electrical connector is not connected to the second electrical connector.

According to an embodiment of the present disclosure, an engaging recess is formed on a side of the second shell adjacent to the first shell for at least partially accommodating the first shell. The first shell is installed on the second shell by the engaging recess.

According to an embodiment of the present disclosure, a shape of the engaging recess substantially corresponds to a shape of a bottom portion of the first shell.

According to an embodiment of the present disclosure, at least one positioning portion protrudes from a side of the second shell adjacent to the first shell for positioning the first shell.

According to an embodiment of the present disclosure, the multipurpose image capturing apparatus further includes a fastening component. A through hole is formed on the at least one positioning portion. A fastening hole is formed on the first shell. The fastening component passes through the through hole to be fastened with the fastening hole for fixing the first shell with the second shell.

According to an embodiment of the present disclosure, the multipurpose image capturing apparatus further includes a detector disposed inside the second shell and electrically connected to the second control unit. The detector is configured to determine whether the second object enters into the chamber to be located at an image capturing position.

According to an embodiment of the present disclosure, the second shell comprises a first assembling component and a second assembling component, the first assembling component is detachably assembled with the second assembling component, and the chamber is formed between the first assembling component and the second assembling component.

According to an embodiment of the present disclosure, the second assembling component is substantially a platform structure. A middle portion of the first assembling component protrudes away from the second assembling component to form the chamber and the opening communicated with the chamber. The second object is allowed to enter the chamber through the opening.

According to an embodiment of the present disclosure, the second image capturing module is disposed on the second assembling component. At least one engaging slot is formed on the first assembling component. The second assembling component is inserted into the at least one engaging slot to be combined with the first assembling component.

In summary, in the present disclosure, when the first electrical connector is electrically connected to the electrical connector of the external apparatus, a user can control the first control unit to transmit the first image captured by the first image capturing module to the external apparatus via the electrical connection of the first electrical connector and the electrical connector of the external apparatus. Furthermore, the user can control the second control unit to transmit the first image transmitted from the first control unit via the electrical connection of the first electrical connector and the second electrical connector of the second electrical connector, or the second image captured by the second image capturing module to the external apparatus when the first electrical connector is electrically connected to the second electrical connector and the third electrical connector is electrically connected to the electrical connector of the external apparatus. The relation of the aforementioned electrical connectors can be adjusted according to practical demands to operate the first image capturing module disposed inside the first shell to capture the first image corresponding to the first object or to operate the second image capturing module disposed inside the second shell to capture the second image corresponding to the second object, and therefore, the multipurpose image capturing apparatus of the present disclosure has flexibility in use. Besides, the first shell can be detached from the second shell for reducing occupied space when it is desired to operate the first image capturing module only.

These and other objectives of the present disclosure will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the disclosure may be practiced. In this regard, directional terminology, such as "top," "bottom," "front," "back," etc., is used with reference to the orientation of the Figure(s) being described. The components of the present disclosure can be positioned in a number of different orientations. As such, the directional terminology is used for purposes of illustration and is in no way limiting. Accordingly, the drawings and descriptions will be regarded as illustrative in nature and not as restrictive.

Figure 1:
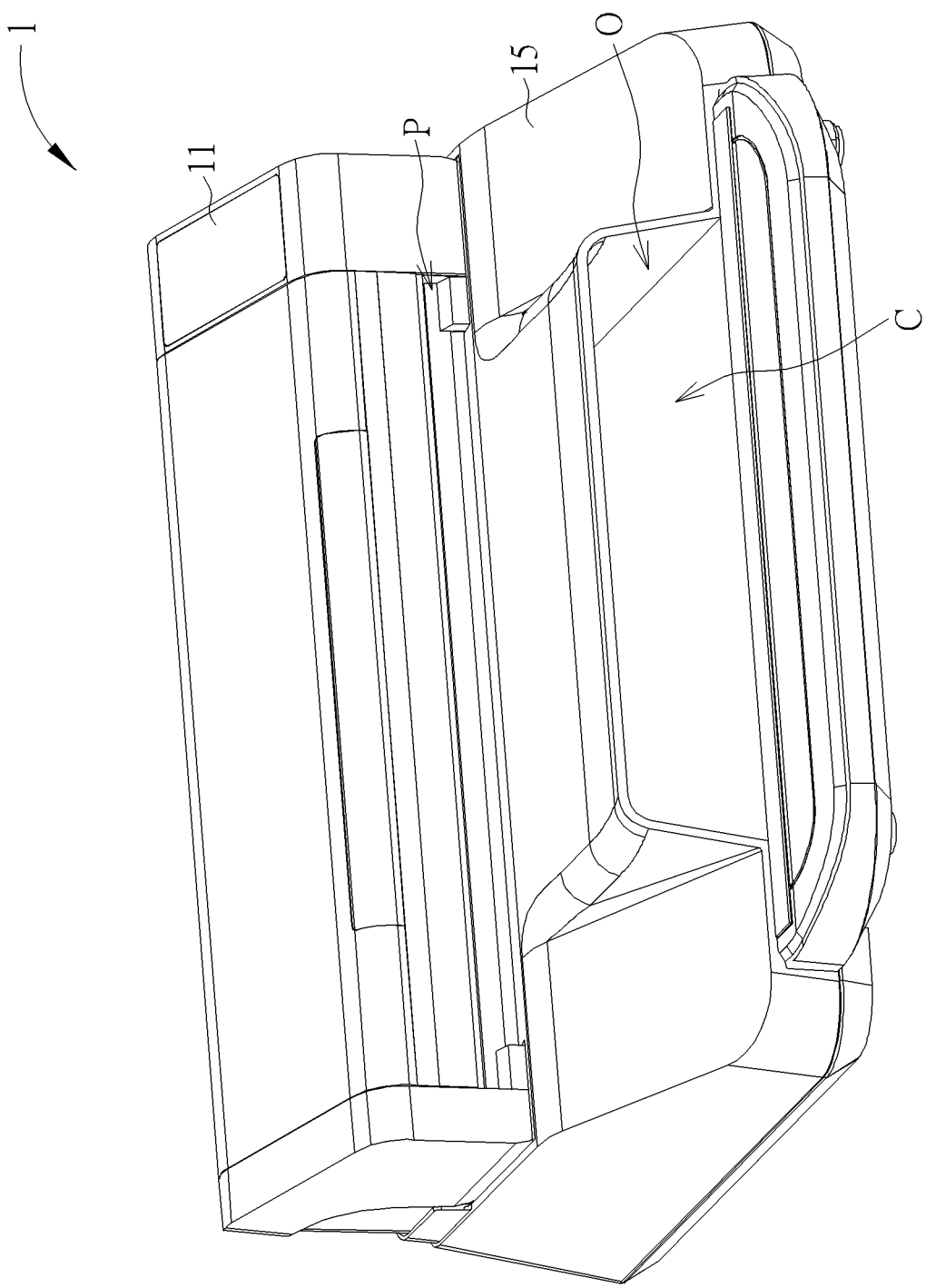
FIG. 1 is a schematic diagram of a multipurpose image capturing apparatus according to a first embodiment of the present disclosure.
Figure 2:
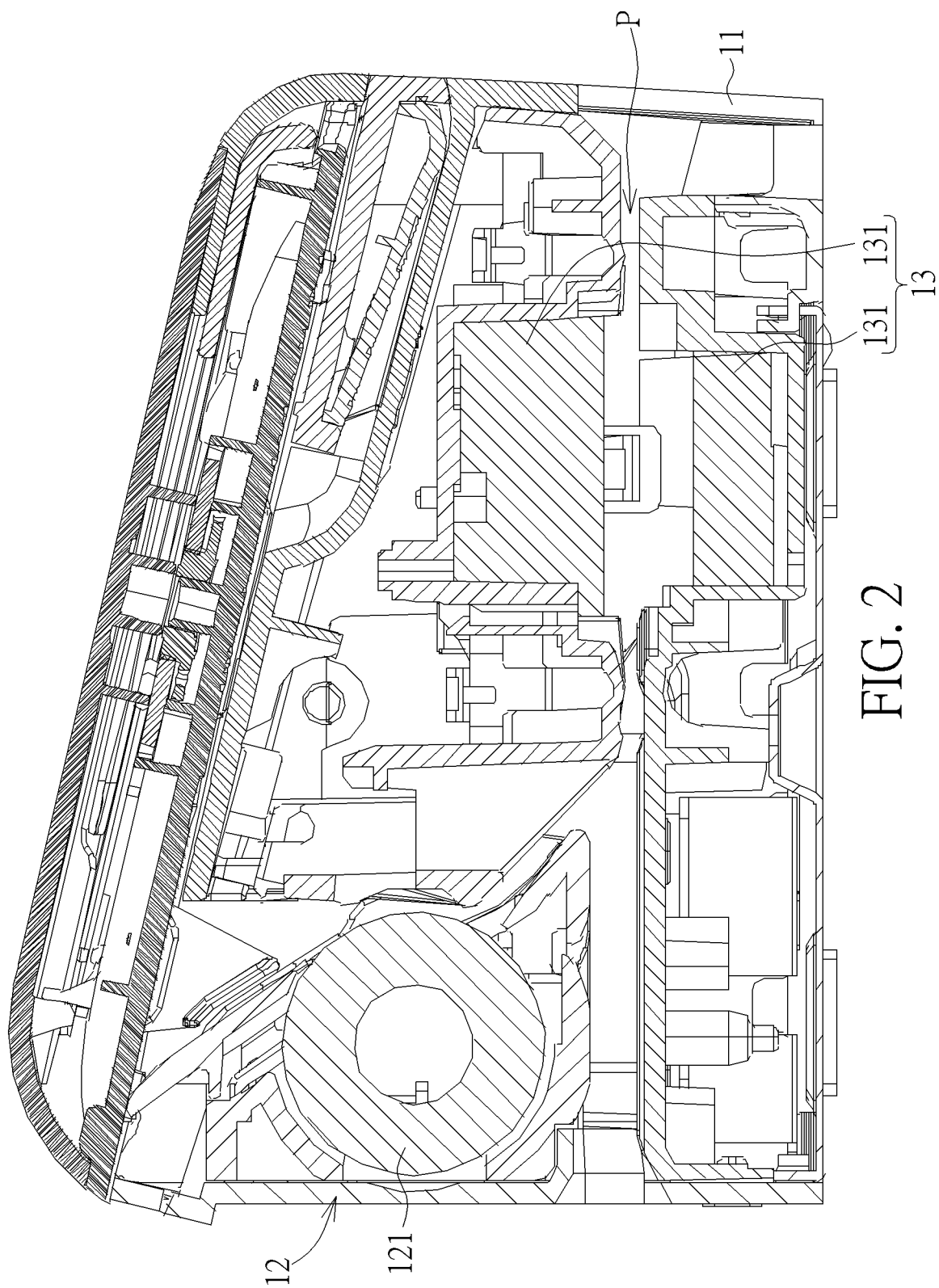
FIG. 2 is an internal structural diagram of the multipurpose image capturing apparatus according to the first embodiment of the present disclosure.
Figure 3:
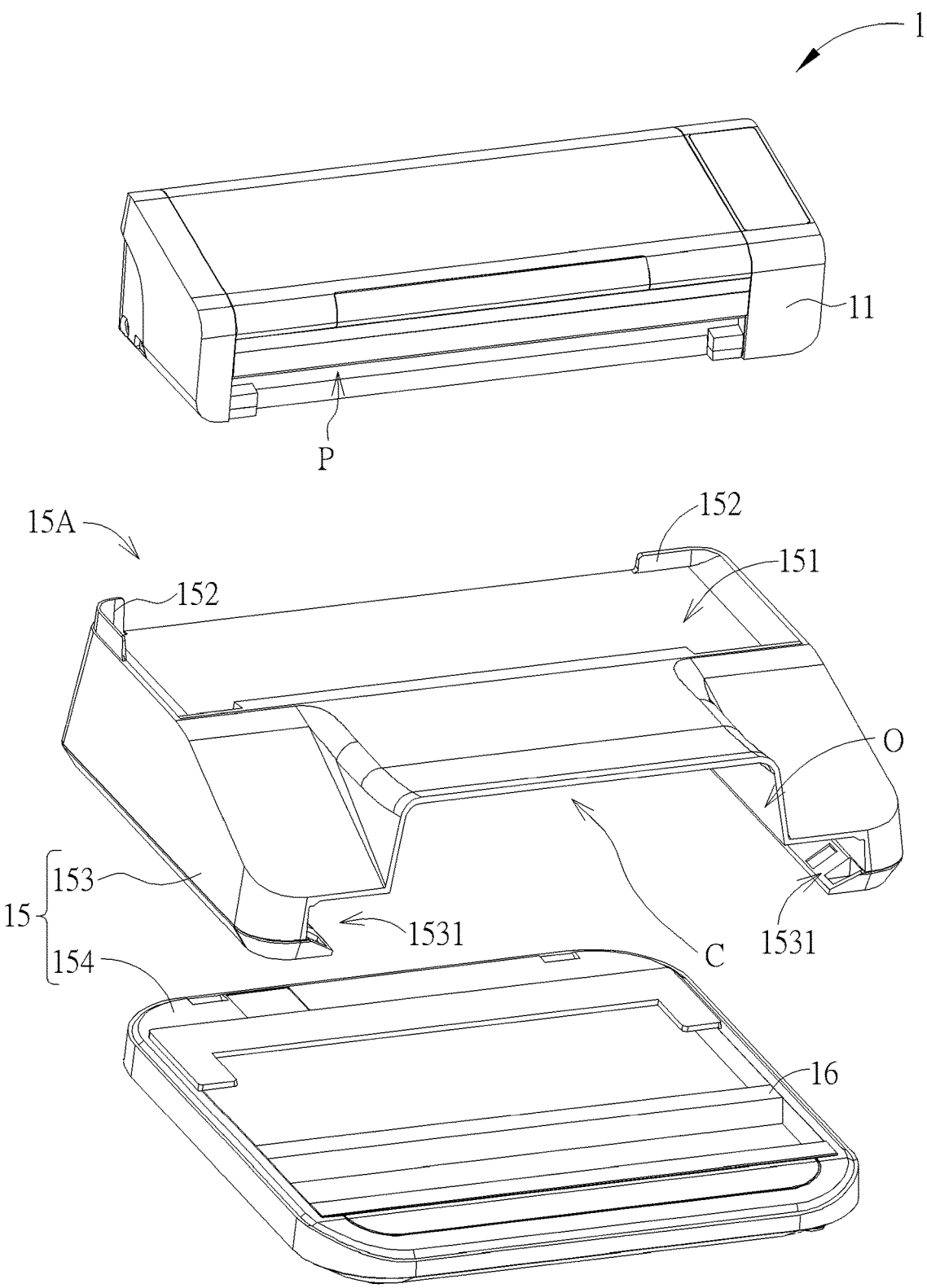
FIG. 3 and FIG. 4 are exploded diagrams of the multipurpose image capturing apparatus at different views according to the first embodiment of the present disclosure.
Figure 4:
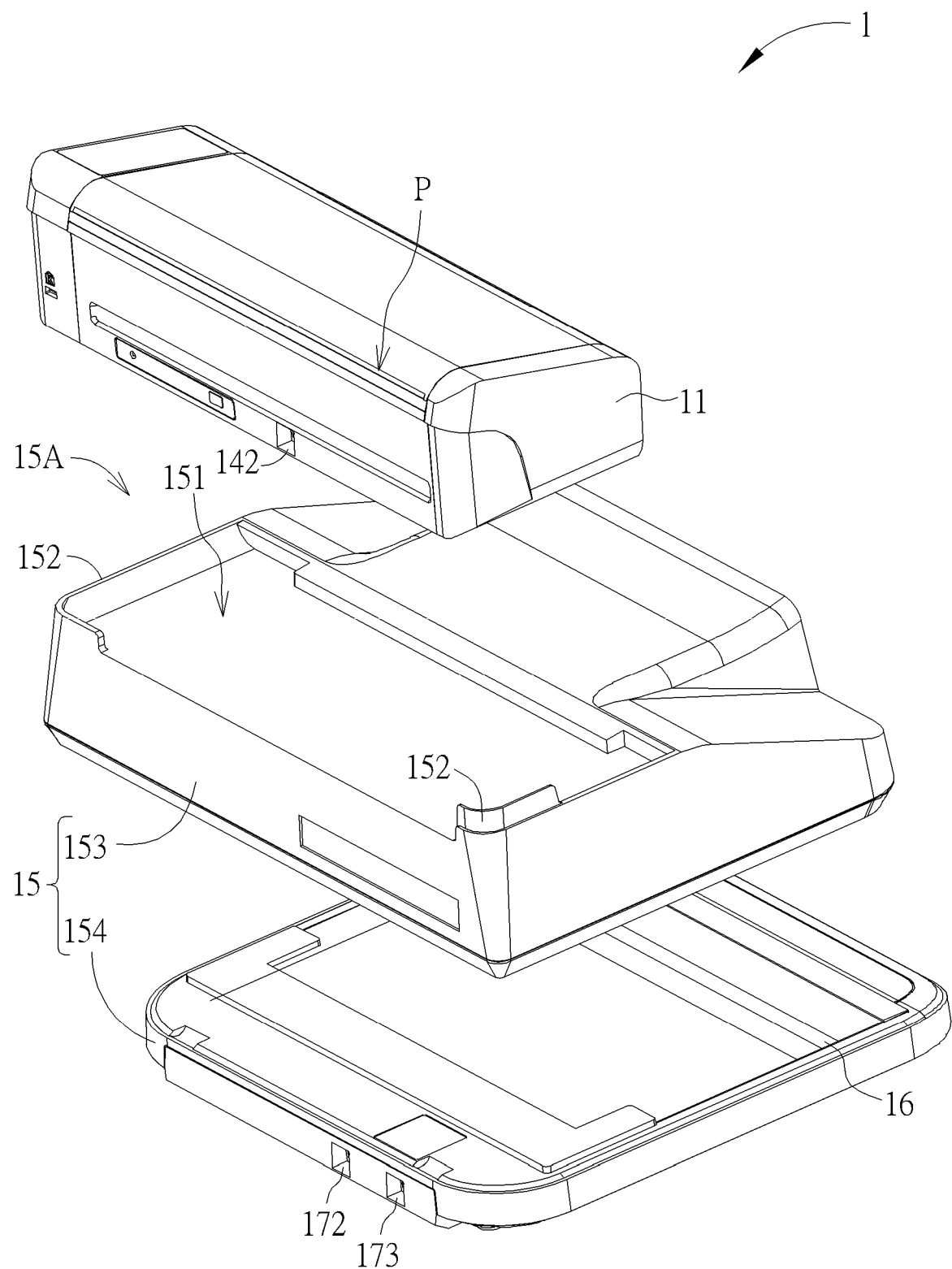
Figure 5:
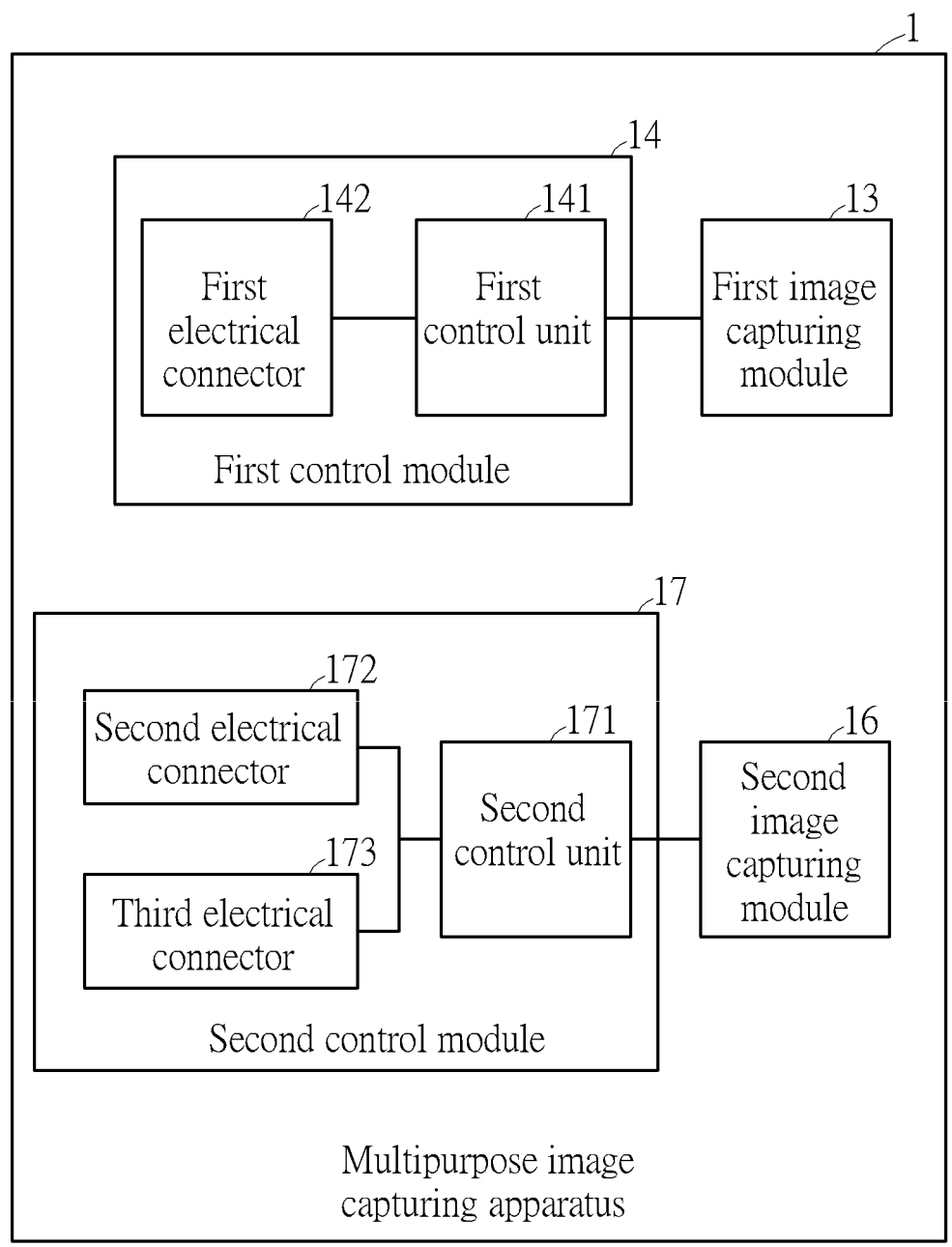
FIG. 5 is a functional block diagram of the multipurpose image capturing apparatus according to the first embodiment of the present disclosure.

Please refer to FIG. 1 to FIG. 5. FIG. 1 is a schematic diagram of a multipurpose image capturing apparatus 1 according to a first embodiment of the present disclosure. FIG. 2 is an internal structural diagram of the multipurpose image capturing apparatus 1 according to the first embodiment of the present disclosure. FIG. 3 and FIG. 4 are exploded diagrams of the multipurpose image capturing apparatus 1 at different views according to the first embodiment of the present disclosure. FIG. 5 is a functional block diagram of the multipurpose image capturing apparatus 1 according to the first embodiment of the present disclosure. As shown in FIG. 1 to FIG. 5, the multipurpose image capturing apparatus 1 has function of scanning or capturing images and includes a first shell 11, a driving assembly 12, a first image capturing module 13, a first control module 14, a second shell 15, a second image capturing module 16 and a second control module 17. A passage P is formed inside the first shell 11. The driving assembly 12 is disposed inside the first shell 11 and for driving a first object, which is not shown in the figures, to move along the passage P. The first object can be a scanned object, such as paper. The first image capturing module 13 is disposed inside the first shell 11 and for capturing a first image corresponding to the first object when the driving assembly 12 drives the first object to pass by the first image capturing module 13 along the passage P, so as to provide a function similar to a sheet-fed scanner. Preferably, in this embodiment, the driving assembly 12 can be a gear drive assembly including a roller 121, a motor, which is not shown in the figures, and a gear set, which is not shown in the figures. However, it is not limited to this embodiment. For example, in another embodiment, the driving assembly also can be a belt drive assembly including a belt. Furthermore, in this embodiment, the first image capturing module 13 can include two optical sensing components 131 disposed at two opposite sides of the passage P, and each optical sensing component 131 can be a charge-coupled device (CCD) or a contact image sensor (CIS). However, the present disclosure is not limited to thereto.

Besides, the second shell 15 is disposed beneath the first shell 11 and supports the first shell 11. A chamber C is formed inside the second shell 15 and for accommodating a second object, which is not shown in the figures. An opening O is formed on the second shell 15 and communicated with the chamber C for allowing the second object to enter the chamber C. The second image capturing module 16 is disposed inside the second shell 15 and for capturing a second image corresponding to the second object, so as to provide a function similar to a flatbed scanner. In this embodiment, the second image capturing module 16 can include an optical sensing component, such as a charge-coupled device (CCD) or a contact image sensor (CIS). However, the present disclosure is not limited to thereto.

Specifically, an engaging recess 151 is formed on a side of the second shell 15 adjacent to the first shell 11, i.e., an upper side 15A of the second shell 15, and for at least partially accommodating the first shell 11. The first shell 11 is installed on the second shell 15 by the engaging recess 151. A shape of the engaging recess 151 can substantially correspond to a shape of a bottom portion of the first shell 15 for restraining the first shell 11 inside the engaging recess 151, so as to achieve a purpose of restraining movement of the first shell 11 relative to the second shell 15. Furthermore, two positioning portions 152 protrude from the upper side 15A of the second shell 15 for positioning the first shell 11. The two positioning portions 152 can be located at an outer periphery of the engaging recess 151 and for guiding the first shell 11 to properly engage with the engaging recess 151 when the first shell 11 is moved toward the engaging recess 151. Besides, the two positioning portions 152 can further prevent the first shell 11 partially accommodated inside the engaging recess 151 from disengaging from the engaging recess 151 when the first shell 11 is forced by an external force. In such a way, installation and positioning of the first shell 11 relative to the second shell 15 can be achieved by the aforementioned configuration. However, the number of the positioning portion is not limited to this embodiment. It depends on practical demands. For example, in another embodiment, there can be only one positioning portion.

Furthermore, the second shell 15 includes a first assembling component 153 and a second assembling component 154 detachably assembled with the first assembling component 153. The second assembling component 154 can be substantially a platform structure. The second image capturing module 16 is disposed on the second assembling component 154. A middle portion of the first assembling component 153 protrudes away from the second assembling component 154. Two engaging slots 1531 are formed on two lateral portions of the first assembling component 153. The second assembling component 154 is inserted into the two engaging slots 1531 to be combined with the first assembling component 153. When the second assembling component 154 is inserted into the two engaging slots 1531 to be combined with the first assembling component 153, the chamber C and the opening O communicated with the chamber C are formed between the first assembling component 153 and the second assembling component 154 for allowing the second object to enter the chamber C through the opening O. In addition, when the second assembling component 154 is inserted into the two engaging slots 1531 to be combined with the first assembling component 153, the second image capturing module 16 disposed on the second assembling component 154 is aligned with the chamber C for capturing the second image corresponding to the second object entering into the chamber C correctly. In such a way, the installation and positioning of the second image capturing module 16 relative to the second shell 15 can be achieved by the aforementioned configuration.

Besides, the first control module 14 includes a first control unit 141 and a first electrical connector 142. The first control unit 141 is electrically connected to the first electrical connector 142 and the first image capturing module 13. The second control module 17 includes a second control unit 171, a second electrical connector 172 and a third electrical connector 173. The second control unit 171 is electrically connected to the second electrical connector 172, the third electrical connector 173 and the second image capturing module 16. In this embodiment, the first control unit 141 or the second control unit 171 can be a microprocessor, a micro control unit (MCU), a digital signal processor (DSP) or any other processing component, or can be realized by an application specific integrated circuit (ASIC). However, the present disclosure is not limited thereto.

The first control unit 141 can transmit the first image captured by the first image capturing module 13 to an external apparatus via electrical connection of the first electrical connector 142 and an electrical connector of the external apparatus when the first electrical connector 142 is electrically connected to the electrical connector of the external apparatus, e.g., the first electrical connector 142 can be electrically connected to the electrical connector by a corresponding data transmission cable. Besides, the first control unit 141 can further transmit the first image captured by the first image capturing module 13 to the second control unit 171 via electrical connection of the first electrical connector 142 and the second electrical connector 172 when the first electrical connector 142 is electrically connected to the second electrical connector 172, e.g., the first electrical connector 142 can be electrically connected to the second electrical connector 172 by a corresponding data transmission cable. Furthermore, the second control unit 171 can transmit the first image transmitted from the first control unit 141 via the electrical connection of the first electrical connector 142 and the electrical connector of the external apparatus, or the second image captured by the second image capturing module 16 to the external apparatus via electrical connection of the third electrical connector 173 and the electrical connector of the external apparatus when the first electrical connector 142 is electrically connected to the second electrical connector 172 and the third electrical connector 173 is electrically connected to the electrical connector of the external apparatus, e.g., the first electrical connector 142 is electrically connected to the second electrical connector 172 by a corresponding data transmission cable, and the third electrical connector 173 is electrically connected to the electrical connector of the external apparatus by a corresponding data transmission cable. The relation of the aforementioned electrical connectors can be adjusted according to practical demands to operate the first image capturing module 13 disposed inside the first shell 11 to capture the first image corresponding to the first object or the second image capturing module 16 disposed inside the second shell 15 to capture the second image corresponding to the second object, and therefore, the multipurpose image capturing apparatus of the present disclosure has flexibility in use.

Furthermore, the second image capturing module 16 of the present disclosure can be configured to capture the second image when the first electrical connector 142 is electrically connected to the second electrical connector 172. The second image capturing module 16 can be configured not to capture the second image when the first electrical connector 142 is not electrically connected to the second electrical connector 172. For example, the second image capturing module 16 can be powered on when the first electrical connector 142 is electrically connected to the second electrical connector 172 and can be powered off when the first electrical connector 142 is not electrically connected to the second electrical connector 172. Therefore, when it is only desired to capture the first image by the first image capturing module 13 without capturing the second image by the second image capturing module 16, the first electrical connector 142 can be electrically connected to the electrical connector of the external apparatus. At this moment, the user can operate the first image capturing module 13 but cannot operate the second image capturing module 16. Therefore, the first shell 11 can be detached from the second shell 15 for reducing occupied space and achieving a purpose of modularization.

Figure 6:
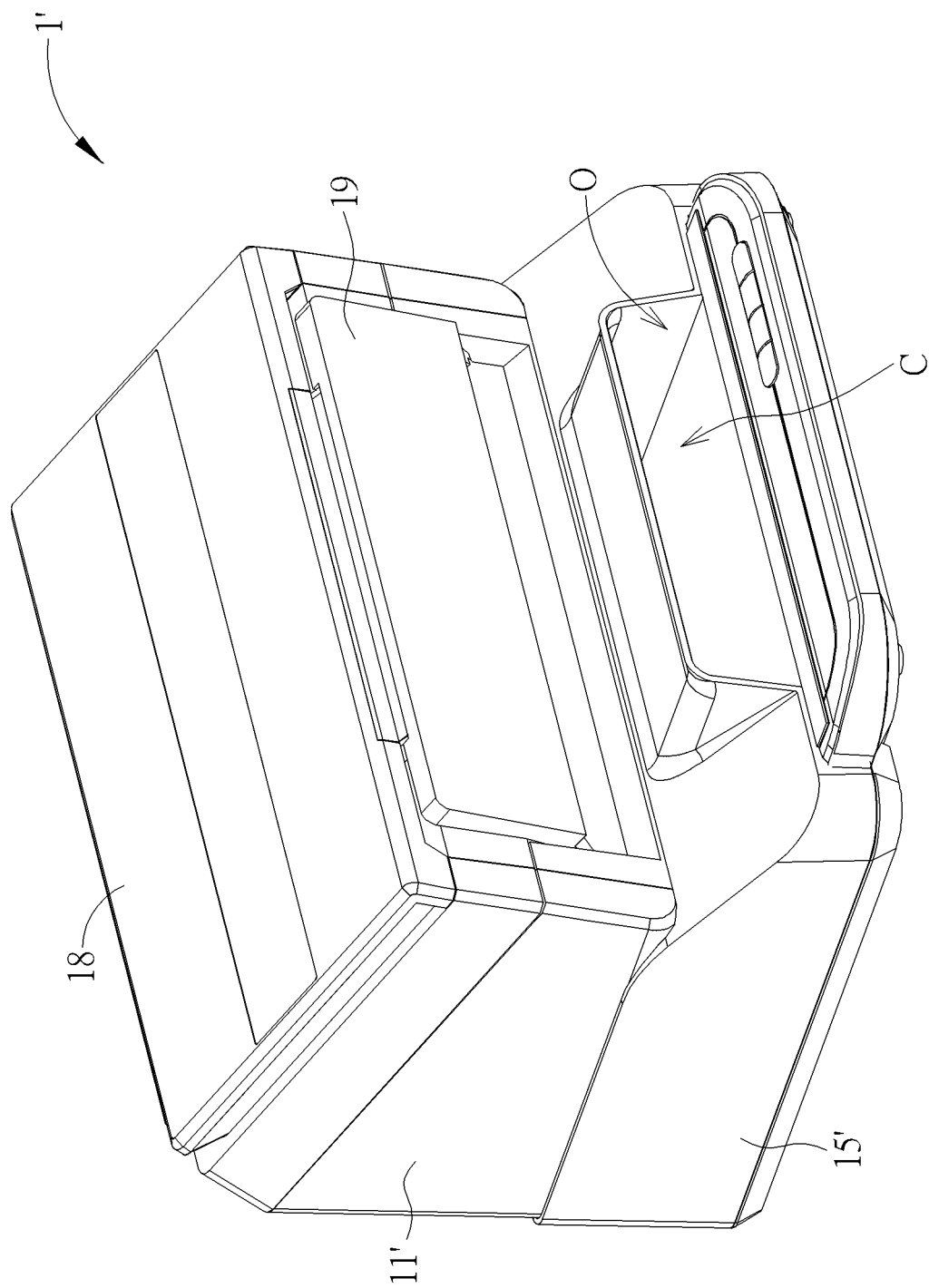
FIG. 6 and FIG. 7 are schematic diagrams of a multipurpose image capturing apparatus in different states according to a second embodiment of the present disclosure.
Figure 7:
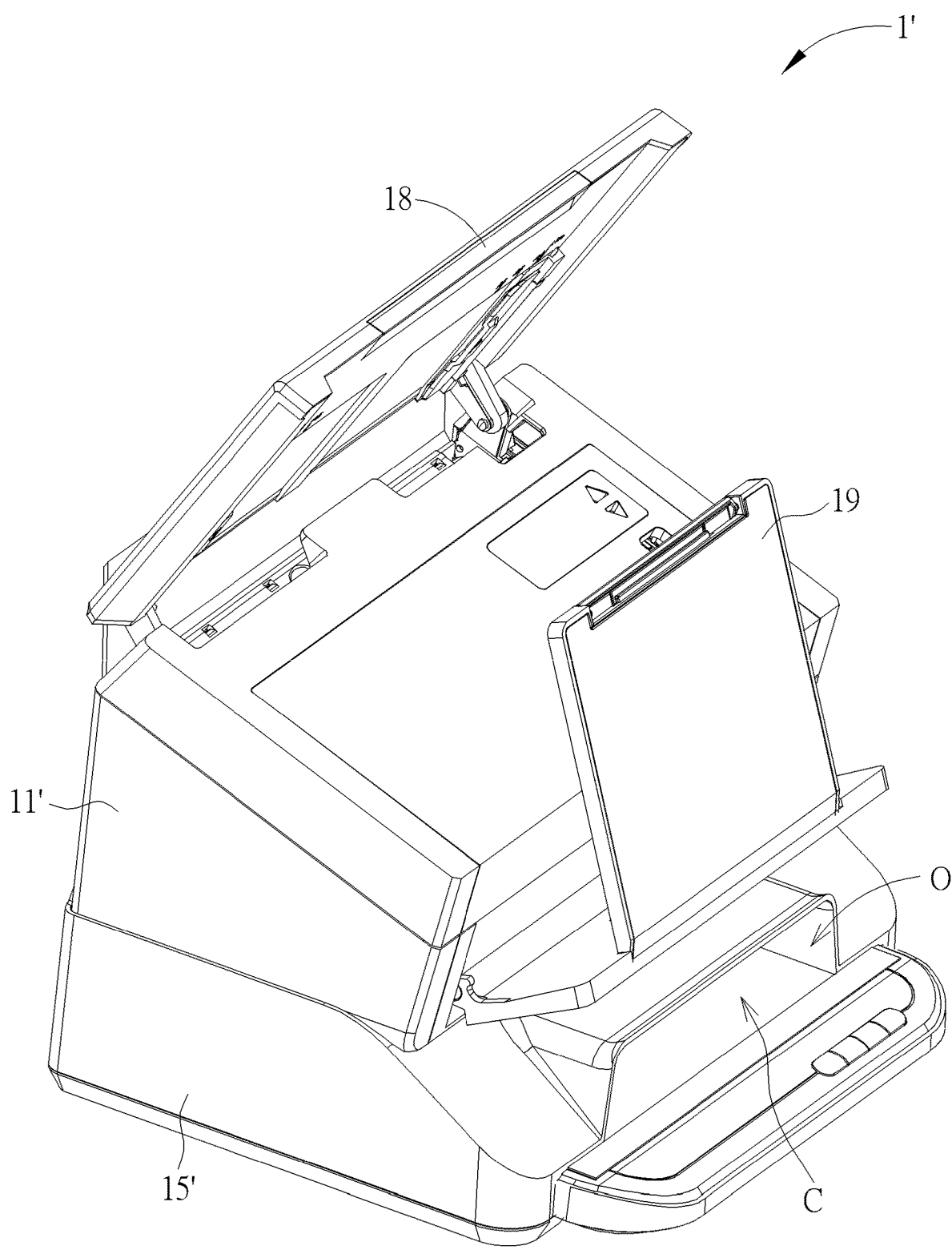
Figure 8:
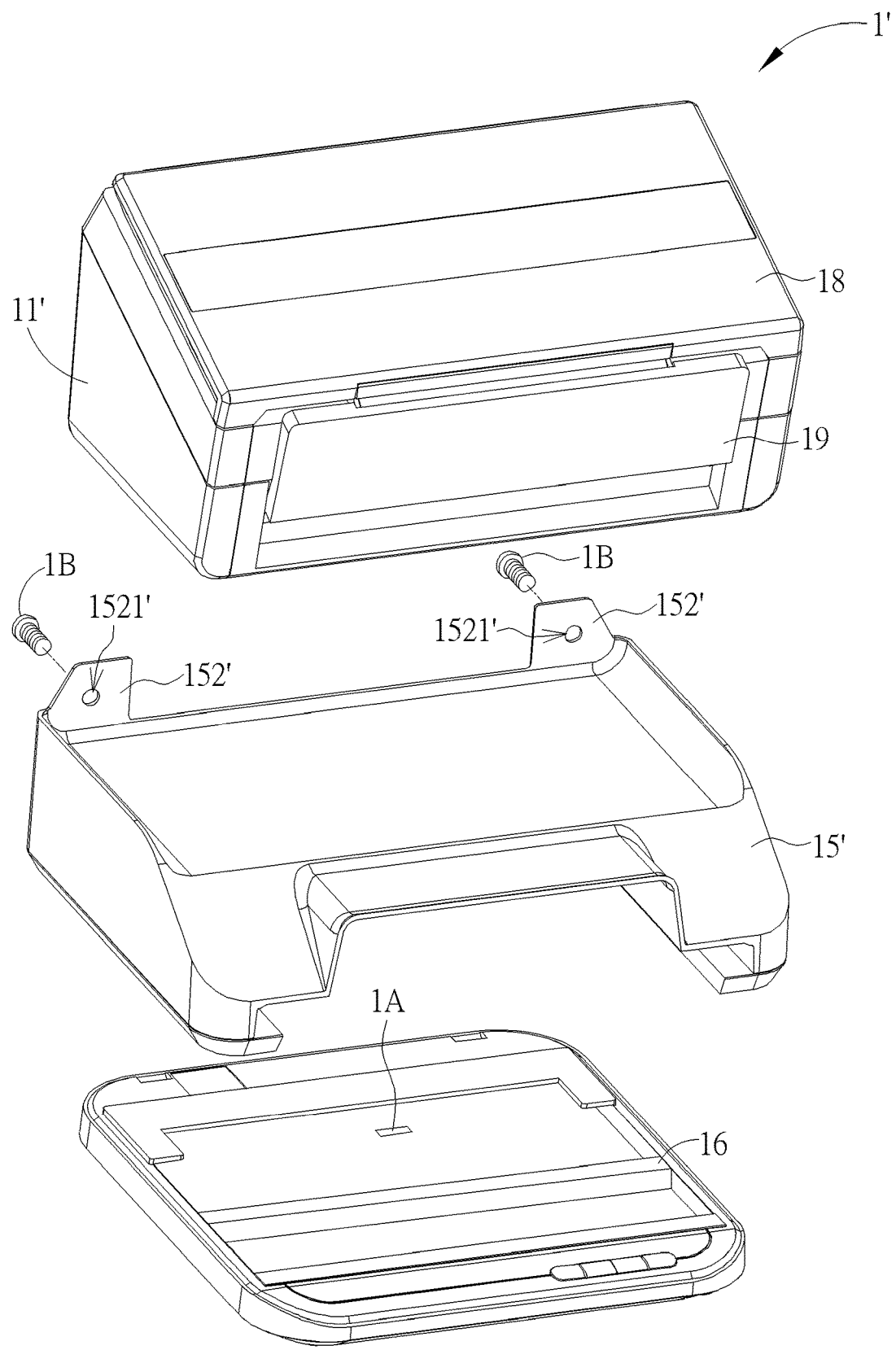
FIG. 8 and FIG. 9 are exploded diagrams of the multipurpose image capturing apparatus at different views according to the second embodiment of the present disclosure.
Figure 9:
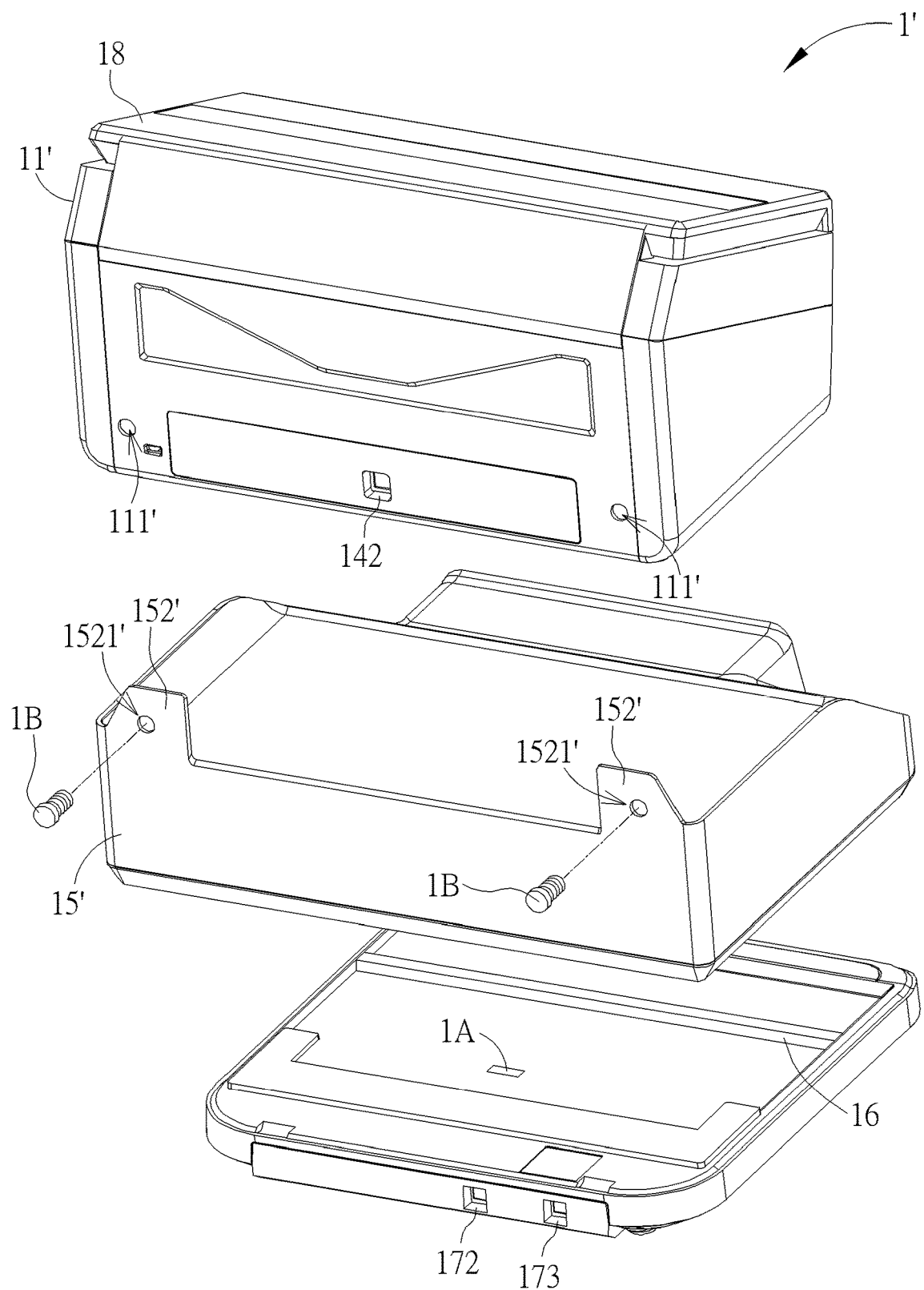
Figure 10:
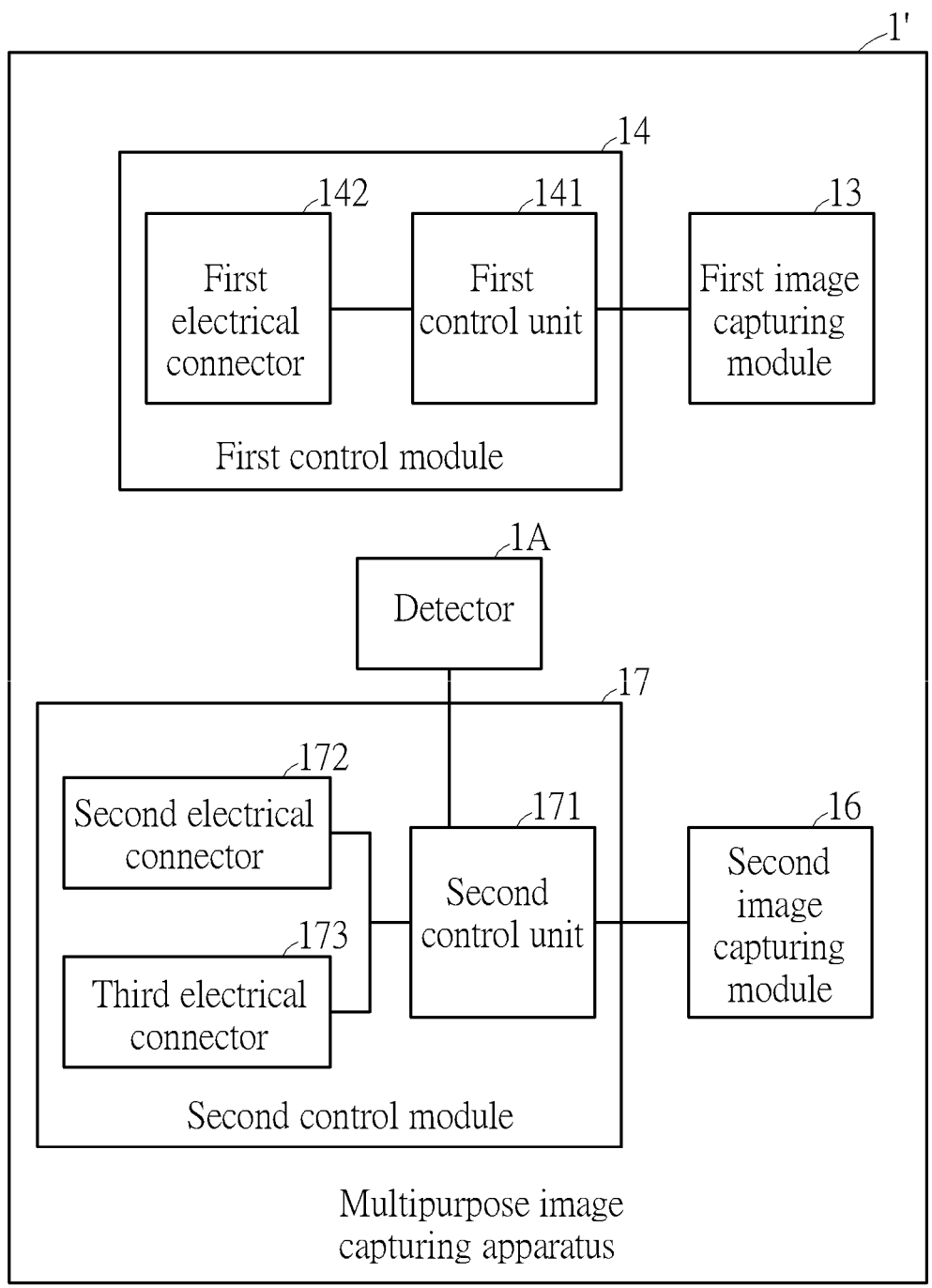
FIG. 10 is a functional block diagram of the multipurpose image capturing apparatus according to the second embodiment of the present disclosure.

Please refer to FIG. 6 to FIG. 10. FIG. 6 and FIG. 7 are schematic diagrams of a multipurpose image capturing apparatus 1' in different states according to a second embodiment of the present disclosure. FIG. 8 and FIG. 9 are exploded diagrams of the multipurpose image capturing apparatus 1' at different views according to the second embodiment of the present disclosure. FIG. 10 is a functional block diagram of the multipurpose image capturing apparatus 1' according to the second embodiment of the present disclosure. As shown in FIG. 6 to FIG. 10, different from the first embodiment, the multipurpose image capturing apparatus 1' of this embodiment further includes a feeding tray 18, an output tray 19, a detector 1A and two fastening components 1B. The feeding tray 18 and the output tray 19 are pivotally connected to a first shell 11' and respectively located at an entrance and an exit of the passage P. The detector 1A is disposed inside the chamber C and electrically connected to the second control unit 171. The detector 1A can determine whether the second object enters into the chamber C to be located at an image capturing position. The second control unit 171 can control the second image capturing module 16 to capture the second image corresponding to the second object when the detector 1A determines that the second object enters into the chamber C to be located at the image capturing position. Therefore, it is not required to operate the second control unit 171 by human machine interface, e.g., a control panel shown in FIG. 8, to control the second image capturing module 16 to capture the second image, which brings convenience in use. In this embodiment, the detector 1A can preferably be a non-contact sensor, such as an optical sensor, or a contact sensor, such as a pressure sensor. However, the present disclosure is not limited thereto.

Furthermore, in this embodiment, two positioning portions 152' protrude from a second shell 15'. A through hole 1521' is formed on each positioning portion 152'. Two fastening holes 111' are formed on the first shell 11'. The two fastening components 1B pass through the two through holes 1521' to be fastened with the two fastening holes 111' for fixing the first shell 11' with the second shell 15', so as to prevent separation of the first shell 11' and the second shell 15'. Structure and operational principle of other components of this embodiment are similar to the ones of the first embodiment. Detailed description is omitted herein for simplicity.

In contrast to the prior art, in the present disclosure, when the first electrical connector is electrically connected to the electrical connector of the external apparatus, a user can control the first control unit to transmit the first image captured by the first image capturing module to the external apparatus via the electrical connection of the first electrical connector and the electrical connector of the external apparatus. Furthermore, the user can control the second control unit to transmit the first image transmitted from the first control unit via the electrical connection of the first electrical connector and the second electrical connector, or the second image captured by the second image capturing module to the external apparatus when the first electrical connector is electrically connected to the second electrical connector and the third electrical connector is electrically connected to the electrical connector of the external apparatus. The relation of the aforementioned electrical connectors can be adjusted according to practical demands to operate the first image capturing module disposed inside the first shell to capture the first image corresponding to the first object or to operate the second image capturing module disposed inside the second shell to capture the second image corresponding to the second object, and therefore, the multipurpose image capturing apparatus of the present disclosure has flexibility in use. Besides, the first shell can be detached from the second shell for reducing occupied space when it is desired to operate the first image capturing module only.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A multipurpose image capturing apparatus comprising:
   a first shell, a passage being formed inside the first shell;
   a driving assembly disposed inside the first shell and for driving a first object to move along the passage;
   a first image capturing module disposed inside the first shell and for capturing a first image corresponding to the first object when the driving assembly drives the first object to pass by the first image capturing module along the passage;
   a first control module comprising a first control unit and a first electrical connector, the first control unit being electrically connected to the first electrical connector and the first image capturing module;
   a second shell disposed beneath the first shell and supporting the first shell, a chamber being formed inside the second shell and for accommodating a second object, an opening being formed on the second shell and communicated with the chamber for allowing the second object to enter the chamber;
   a second image capturing module disposed inside the second shell and for capturing a second image corresponding to the second object accommodated inside the chamber; and
   a second control module comprising a second control unit, a second electrical connector and a third electrical connector, the second control unit being electrically connected to the second electrical connector, the third electrical connector and the second image capturing module;
   wherein the first control unit transmits the first image captured by the first image capturing module to an external apparatus via an electrical connection of the first electrical connector and an electrical connector of the external apparatus when the first electrical connector is electrically connected to the electrical connector of the external apparatus, the first control unit transmits the first image captured by the first image capturing module to the second control unit via an electrical connection of the first electrical connector and the second electrical connector when the first electrical connector is electrically connected to the second electrical connector, and the second control unit transmits the first image transmitted from the first control unit via the electrical connection of the first electrical connector and the second electrical connector, or the second image captured by the second image capturing module to the external apparatus when the first electrical connector is electrically connected to the second electrical connector and the third electrical connector is electrically connected to the electrical connector of the external apparatus.

2. The multipurpose image capturing apparatus of claim 1, wherein the second image capturing module is configured to capture the second image when the first electrical connector is connected to the second electrical connector, and the second image capturing module is configured not to capture the second image when the first electrical connector is not connected to the second electrical connector.

3. The multipurpose image capturing apparatus of claim 1, wherein an engaging recess is formed on a side of the second shell adjacent to the first shell for at least partially accommodating the first shell, and the first shell is installed on the second shell by the engaging recess.

4. The multipurpose image capturing apparatus of claim 3, wherein a shape of the engaging recess substantially corresponds to a shape of a bottom portion of the first shell.

5. The multipurpose image capturing apparatus of claim 1, wherein at least one positioning portion protrudes from a side of the second shell adjacent to the first shell for positioning the first shell.

6. The multipurpose image capturing apparatus of claim 5, further comprising a fastening component, a through hole being formed on the at least one positioning portion, a fastening hole being formed on the first shell, and the fastening component passing through the through hole to be fastened with the fastening hole for fixing the first shell with the second shell.

7. The multipurpose image capturing apparatus of claim 1, further comprising a detector disposed inside the second shell and electrically connected to the second control unit, and the detector being configured to determine whether the second object enters into the chamber to be located at an image capturing position.

8. The multipurpose image capturing apparatus of claim 1, wherein the second shell comprises a first assembling component and a second assembling component, the first assembling component is detachably assembled with the second assembling component, and the chamber is formed between the first assembling component and the second assembling component.

9. The multipurpose image capturing apparatus of claim 8, wherein the second assembling component is substantially a platform structure, a middle portion of the first assembling component protrudes away from the second assembling component to form the chamber and the opening communicated with the chamber, and the second object is allowed to enter the chamber through the opening.

10. The multipurpose image capturing apparatus of claim 8, wherein the second image capturing module is disposed on the second assembling component, at least one engaging slot is formed on the first assembling component, and the second assembling component is inserted into the at least one engaging slot to be combined with the first assembling component.

* * * * *